United States Patent [19]

Chlystun

[11] 4,082,827
[45] Apr. 4, 1978

[54] PROCESS FOR BLOW MOLDING OF A SPOUT CONTAINER

[76] Inventor: Walter K. Chlystun, 327 St. James Dr., Spartanburg, S.C.

[21] Appl. No.: 656,644

[22] Filed: Feb. 9, 1976

[51] Int. Cl.$^2$ ............................................. B29C 17/07
[52] U.S. Cl. ..................................... 264/98; 222/529; 425/525
[58] Field of Search ....................... 264/89, 90, 92, 94, 264/96–99; 425/DIG. 214; 215/1 C; 222/529

[56] References Cited

U.S. PATENT DOCUMENTS

| 3,481,501 | 12/1969 | Anderson | 215/1 C X |
| 3,690,522 | 9/1972 | Chlystun | 222/529 |
| 3,856,187 | 12/1974 | Chlystun | 222/529 |

FOREIGN PATENT DOCUMENTS

| 1,344,169 | 10/1963 | France | 264/94 |
| 42-19955 | 5/1967 | Japan | 264/98 |

*Primary Examiner*—Jan H. Silbaugh

*Attorney, Agent, or Firm*—Wellington M. Manning, Jr.; Luke J. Wilburn, Jr.

[57] ABSTRACT

A process for the production of a blow molded container having an improved spout withdrawal means provided thereon. Process steps of the present invention generally comprise the extrusion of a thermoplastic parison in a pliant form between a plurality of mold sections; bringing the mold sections together into registry and entrapping the parison therebetween at points above and below mold cavities that are provided in said mold sections; simultaneously entrapping a portion of said parison adjacent an end of said mold between angularly presented forming sections, and compression molding an integral portion of said container at an angle with respect to the container to develop a memory bias therein; and injecting a blowing fluid internally of said parison to inflate the parison into conformity with the cavities in said mold, whereby a blow molded container is produced having a compression molded integral portion extending outwardly therefrom.

9 Claims, 6 Drawing Figures

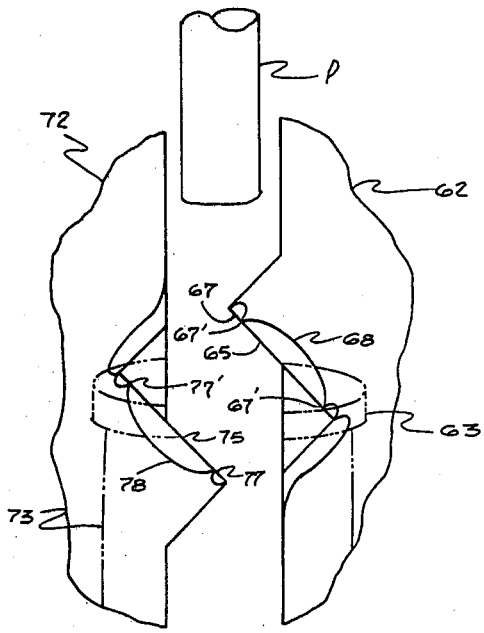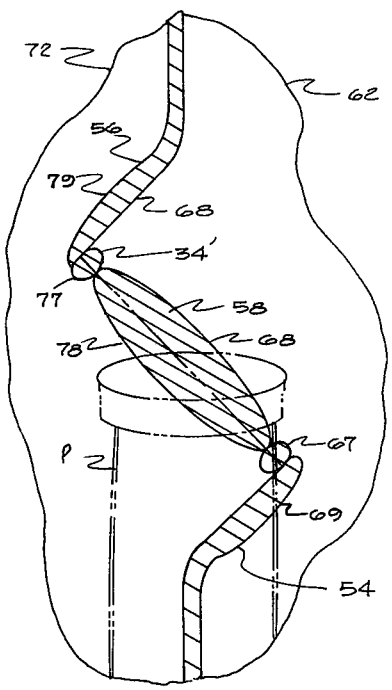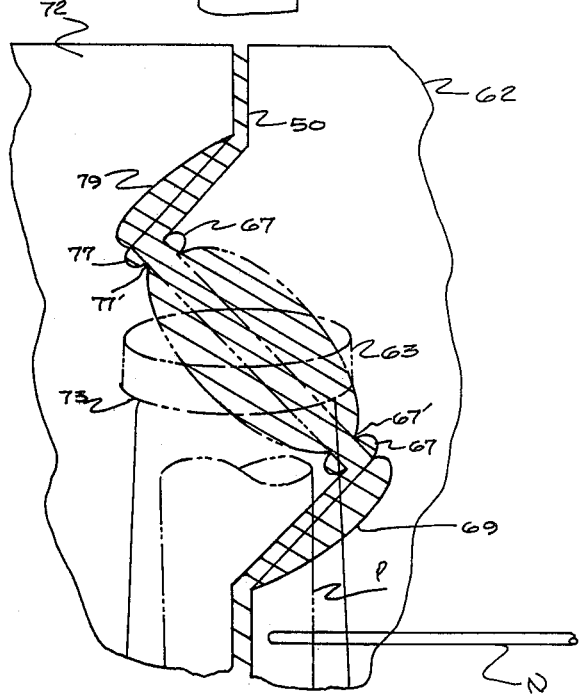

PROCESS FOR BLOW MOLDING OF A SPOUT CONTAINER

BACKGROUND OF THE INVENTION

Blow molded containers have been produced heretofore with nestable spouts produced integral therewith, said spouts being removeable from a nested position to provide a dispensing means once a cover has been removed from an end of the spout. With such a structure, it is particularly desirable to afford some suitable means for withdrawing the spout from its nested position. Numerous devices have been employed such as lifting tabs, tapes, handles and the like. Examples of lifting tabs are illustrated in the Chlystun U.S. Pat. Nos. 3,690,522 and 3,856,187.

The present invention affords an improved arrangement for producing the blow molded container having an integral spout and having means integral therewith for withdrawing the spout from its nested position. The process of the present invention is economical in operation and provides an improved spout withdrawal means integral with the container that performs well in remaining atop the container at a desirable altitude and is quite suitable for removal of the spout when desired. Further in certain embodiments, the withdrawal means opens the spout during or at termination of spout withdrawal.

The prior art is devoid of teaching or suggesting the present process. Exemplary of the prior art are U.S. Pat. Nos. 2,533,305 to Wells; 2,685,385 to Kuss; 3,895,654 to Rieke; 3,402,271 to Winstead; 3,298,577 to Chlystun; 3,326,421 to Peace; 3,481,515 to Booth et al; 3,502,246 to Kelbch, and 3,690,522 to Chlystun.

SUMMARY OF THE INVENTION

It is an object of the present invention to provide an improved process for producing the blow molded container.

Another object of the present invention is to provide an improved process for the production of a blow molded container having a pouring spout integral therewith and have a withdrawal means integral with said spout.

Yet another object of the present invention is to provide an improved process for a combined blow molding, compression molding operation.

Still another object of the present invention is to provide an improved process for simultaneously producing a spout container and a spout withdrawal means which has a memory of a twisted configuration.

Generally speaking, the process of the present invention comprises the steps of providing a tubular, formable plastic material between open mold sections; bringing said mold sections into registry and entrapping said plastic material therebetween at opposite ends of cavities defined in said mold sections; simultaneously forcing a portion of said plastic material outside said mold cavities into an offset angular position with respect to a center line through said mold cavities into die cavities and compression forming a pull tab integral with said parison within the confines of said mold cavities; and thereafter injecting a blow fluid into the interior of said parison, whereby said parison is inflated into conformity with said mold cavities.

More specifically, in the production of a blow molded container having a pouring spout integral therewith or having a top of a container with an integral pouring spout where the top is to be applied to a container body, it is desirable to provide some attached means for assistance in removal of the spout from a nested position within the container. With the spout in a nested position with the container, such as might be encountered prior to dispensing any of the contents of the container, the means for withdrawal of the spout should be secured in some fashion to the spout and positioned adjacent the top of the container to avoid interference with the container during stacking and handling. According to the teachings of the present invention, a pull tab is compression molded integral with the pouring spout prior to blow molding of the container. The pull tab is compression molded at an angle downward from a horizontal line across the top of the spout. Thereafter, with the spout in a nested position within the container, the pull tab engages the top of the container and due to the memory of a downward position as molded, is biased against the top of the container to remain in an approximate flat state thereat.

In producing the compression molded, integral pull tab according to the present invention, the blow molded cavities that define an upper end of the pouring spout have offset compression molding dies adjacent thereto, each of which has both male and female segments. The compression molding dies are angularly offset from a center line through the blow mold cavities and a portion of the pliant plastic material or parison is engaged at said angle from a center line through the container, whereby a portion of the parison will be forced into the offset, compression mold cavities. The lift tab is thus formed with an angular memory with respect to a horizontal line tangent to the top of the pouring spout and preferably has an opening therein through which a finger or other item may be passed for gripping the tab to lift same and to withdraw the pouring spout from its nested position.

BRIEF DESCRIPTION OF THE DRAWINGS

FIGS. 4 and 5 illustrate a portion of the mold for producing the container of the present invention demonstrating the compression mold cavities in an open and nearly closed position.

FIG. 6 illustrates a portion of the mold for producing the container of the present invention in the closed position.

DESCRIPTION OF THE PREFERRED EMBODIMENTS

Making reference to the Figures, preferred embodiments of the present invention will be described in detail. The process of the present invention is designed to produce a container that may be conveniently employed to hold petroleum products, chemicals, and the like that are to be pour dispensed all at once or over a period of time. Particular use of the container produced by the present invention is found in situations where it is desirable to pour the contents of the container into a receptacle that is not readily accessible such as a location on an internal combustion engine for receiving oil therein. Many uses of the container produced by the process of the present invention, however, may be made in wide and varied environs.

Figure 1:
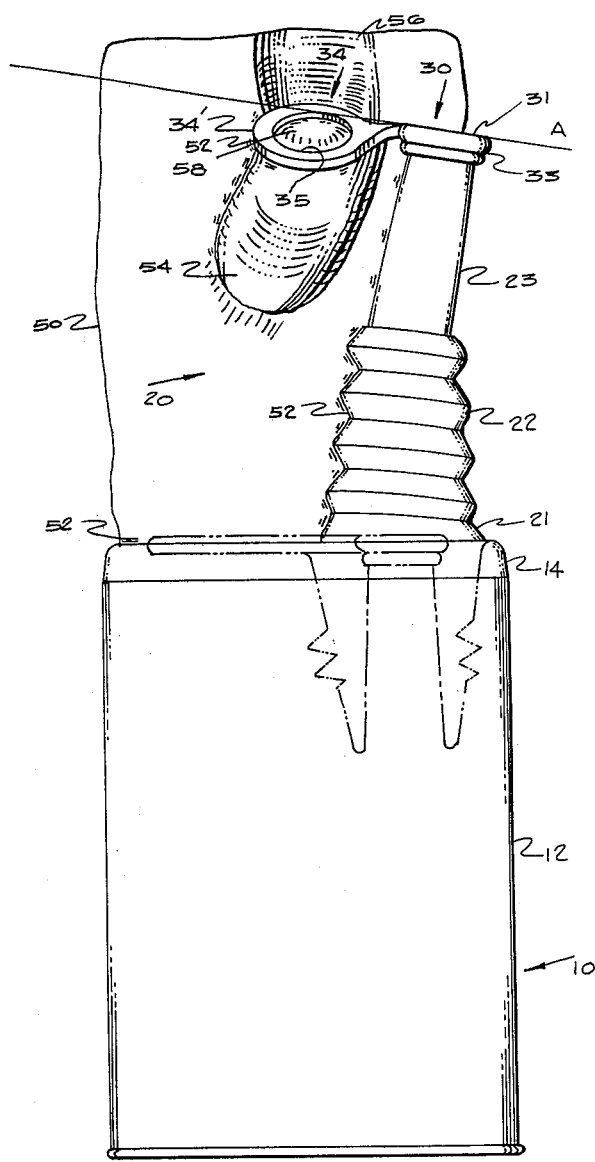
FIG. 1 is a side elevational view of a blow molded container according to the present invention having a compression molded pull tab integral with a pouring spout thereon, and showing a part of the flashing from the molding operation in tact with the container.
Figure 2:
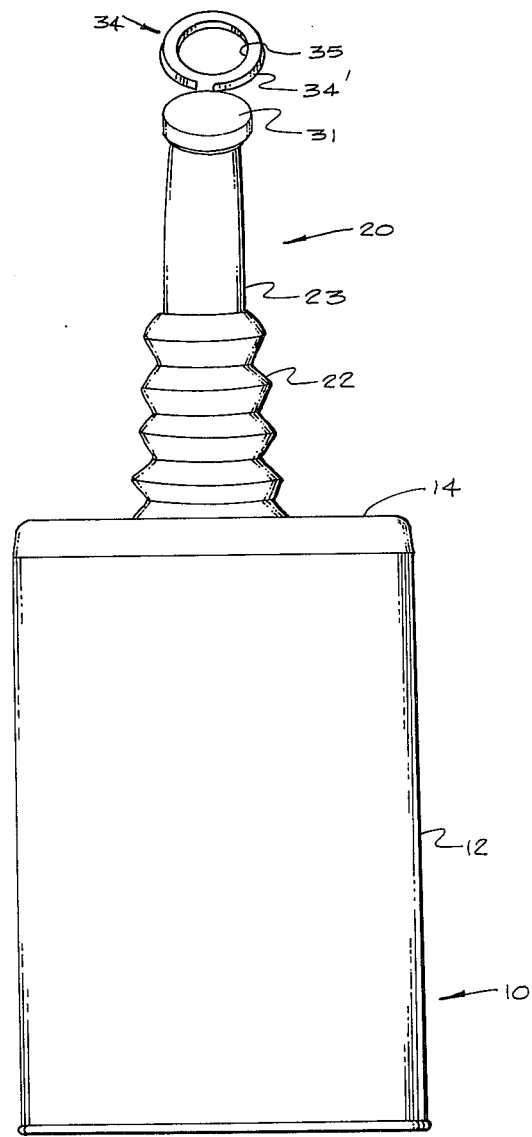
FIG. 2 is a front elevational view of the container as shown in FIG. 1 with the flashing removed, illustrating the angular configuration of the pull tab with respect ot an extended pouring spout.
Figure 3:
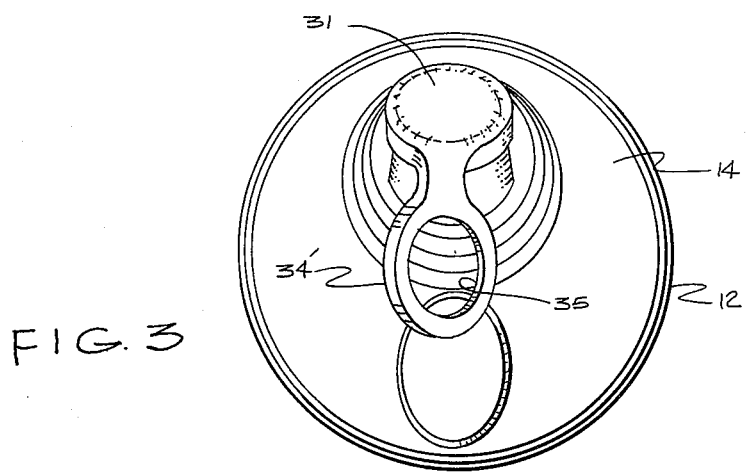
FIG. 3 is a top plan view of the container as shown in FIGS. 1 and 2 with the flashing removed.

In FIGS. 1, 2 and 3, a container generally indicated as 10 is provided having a side wall 12 that is generally cylindrical in shape. A top 14 is provided that is secured to side wall 12 and preferably is of unitary construction therewith. Secured to top wall 14 is a spout generally indicated as 20 which is provided to permit dispensing of the contents from within the container. As shown in FIGS. 1, 2 and 3, spout 20 is in an extended position preparatory to dispensing the contents of the container. As the container is filled, the spout is presented in a nested position within the container as illustrated in phantom in FIG. 1.

Spout 20 as shown in the drawings has a radius 21 at the juncture with top 14 where an inward bend is produced during collapse of the spout into the container. A plurality of accordion pleats 22 are produced along the length of spout 20 with a tubular forward end 23 secured thereto. At the tip of the tubular forward end of spout 23 is a cover generally indicated as 30. Cover 30 as will be illustrated further hereinafter can be simply a cover member for the spout that is removed therefrom so as to permit the contents of the container to pass through the spout during pouring. Additionally, however, though not specifically illustrated herein, cover 30 can be a cap that is removed from the spout 20 and thereafter may be reapplied onto the upper end 23 of spout 20 in a resealing or reclosing arrangement as exemplified in U.S. Pat. Nos. 3,298,577; 3,690,522; and 3,856,187 to Walter K. Chlystun; co-pending application Ser. No. 638,618, filed Dec. 8, 1975 in the name of Walter K. Chlystun; and the like.

Cover 30 in its securement to spout 20 may simply be an extension thereof to seal the forward end of spout 20. In a preferred arrangement, a weakened tear area 33 is provided adjacent forward end 23 of spout 20 and a cap 31 that forms a part of cover 30. First weakened tear area 33 preferably extends completely around forward end 23 of spout 20 to permit cap 31 to be more easily severed or pulled apart from spout 20. As further shown, the cover 30 includes a withdrawal means 34. Withdrawal means 34 is secured to cover 30 and is lifted to withdraw spout 20 in a convenient manner from its nested position within container 10. Withdrawal means 34 is preferably a tab that is integral with and extends outwardly from cap 31 over container top 14 and has a finger opening 35 extending therethrough. One may thus extend a finger through appropriate opening 35 of withdrawal means 34 and lift upwardly to withdraw spout 20 from its nested position within container 10.

As will be described in more detail hereinafter, spout withdrawal means 34 is produced at an angle with respect to a horizontal line A tangent to the top of cover 31. Hence, when spout 20 is nested within container 10, withdrawal means 34 is in engagement with container top 14 where the memory of the angle at which withdrawal means 34 was produced biases withdrawal means 34 against container top 14 for a snug fit.

The lower end of container 10 is provided with a bottom lid 16 where a suitable closure is produced between body side wall 12 and lid 16. With the body of container 10, spout 20 and withdrawal means 34 produced as a unitary item, container 10 can then be filled on existing fill equipment and a metal lid 16 secured in place during the fill operation. Such an arrangement renders the container produced by the present process more desirable since no new major process equipment is needed to incorporate container 10 into a consumer's process line.

Container 10 of FIG. 1 is further illustrated to have a portion of flashing generally indicated as 50 secured to top 14, one side of spout 20, and enveloping withdrawal means 34. Flashing is waste material that results from the molding process at both ends of the container and it automatically or manually removed from the container at the time of or subsequent to the molding operation. As can be seen in FIG. 1, flashing 50 extends outwardly from its juncture lines 52 that connects same to the various portions of container 10. At juncture lines 52, flashing 50 diminishes to a fine point to permit a smooth severance along the outer peripheral lines of the container thereat.

Flashing 50 adjacent withdrawal means 34 as viewed in FIG. 1 shows a bulbous area 54 beneath withdrawal means 34 and a depression 56 above withdrawal means 34. Areas 54 and 56 result from the compression molding of withdrawal means 34 as will be described in more detail hereinafter. Also note a pocket of flashing 58 that is positioned within finger opening 35 of withdrawal means 34.

Making reference to FIGS. 4, 5 and 6, the process of the present invention will now be described in detail. In each of FIGS. 4, 5 and 6, portions of mold sections are illustrated as might be employed in a blow mold process where a pliant plastic material is produced, generally by extrusion, between appropriate mold sections; the mold sections are then brought into registry while simultaneously entrapping portions of the pliant plastic material, referred to as a parison, at the lower and upper edges of the mold. Thereafter, a blow fluid is admitted to the interior of the parison by a blow needle, blow pin or the like and the fluid expands the plant parison into conformity with the mold cavities. While the parison is held in conformity with the mold, sufficient cooling is permitted such that once the mold sections are separated, a product is provided having an outer contour that mates with the mold cavities.

According to the present invention, the blow mold cavities are shaped such that a container of the type as shown in FIGS. 1, 2 and 3 is generally produced. In further definition of the present process, as the mold sections come into registry, a portion of the parison adjacent the section of the mold that produces the spout is forced away from a center line of the mold to a position adjacent the mold cavities that define the spout cap or cover. As the mold sections continue to come into registry, this moved portion of parison in entrapped by mating male and female die members that form a part of the mold, whereby a withdrawal means for the spout is produced by compression molding as a unitary part of the container.

The blow mold process is believed sufficiently known to those skilled in the art that a detailed description of same is not necessary at this point. As such, only the portions of the molds are illustrated that depict the compression molding of the withdrawal means adjacent the section where the spout and spout cover are blow molded into conformity with the blow mold cavities.

In FIGS, 4, 5 and 6 a portion of a parison P of a pliant plastic material such as polyethylene, polypropylene and the like is shown as having been preconditioned and extruded from appropriate apparatus to be positioned between a pair of opened mold sections 62 and 72. Once parison P is properly positioned between the mold sections 62 and 72, appropriate movement thereof is made to close the mold sections around the parison P and entrap same, generally at upper and lower portions of the mold sections. As can be seen in the Figures, a phantom presentation of mold cavities 63 and 73 are shown illustrative of a portion of the container 10 at the upper part of the spout 23 and the spout cap 31. As also shown in the Figures, these blow mold cavities are located behind appropriate compression molding sections 65 and 75, whereby during closing of mold sections 62 and 72, an appropriate portion of the parison P would be forced away from the blow mold cavity sections 63 and 73 towards compression molding sections 65 and 75.

As mentioned earlier, the spout withdrawal means 34 of container 10 are preferably produced at an angle with respect to a line tangent to the top of the spout. Note for example, in FIG. 4 as the mold sections 62 and 72 come into registry, the angular presentation of compression mold sections 64 and 74 permits ready mating thereof with the portion of parison P entrapped therebetween. Further in this regard, note that each mold section has male and female die segments.

FIG. 5 shows mold sections 62 and 72 just prior to complete registry with the parison material being entrapped therebetween. Note further in FIG. 5 an end of a blow needle that has protruded from an appropriate location in the blow mold cavity and pierced the parison P shown in phantom within the closed sections of the blow mold cavities. Parison P within the blow mold cavities is illustrated in phantom and has been cut off below the point where it would be engaged atop the blow mold cavities for the sake of simplicity. Air or any suitable expanding fluid can then be expelled into the inside of the portion of parison P within the blow mold cavities while parison P is still in a pliant condition such that parison P is expanded into conformity with the blow mold cavities as depicted in FIG. 6.

During the registration of mold sections 62 and 72 as the portion of parison P is being forced into the compression mold cavities 65 and 75, the male and female portions thereof mate to define the lift tab 34 as is best illustrated in FIG. 1. With particular reference to FIGS. 4 through 6, however, it may be seen that as mold sections 62 and 72 come into registry, compression mold sections 65 and 75 come together at the prescribed angle and entrap the offset portion of parison P therebetween. In FIG. 5, compression mold sections 65 and 75 have almost come into registry and the parison therebetween is beginning to be forced into the compression mold cavities. Depressions 67 and 77 of sections 65 and 75, respectively, cooperate during registry to form the ring 34′ of withdrawal means 34 while depressions 68 and 78 collect parison and form the flashing area 58. Note that the compression molds between depressions 67 and 68 and 77 and 78 each form an apex 67′ and 77′. At registry, apexes 67′ and 77′ are directly across from each other and form flashing junction line 52 within ring 34′ to facilitate later removal of flashing area 58 from within ring 34 to define finger opening 35.

During registry of compression mold sections 65 and 75, excess parison is present and must be removed to facilitate formation of withdrawal means 34. Flashing clearance means 69 and 79 have thus been provided contiguous to compression mold sections 65 and 75, respectively. It is the flashing in these clearance areas that form the bulbous flashing area 54 below the withdrawal means as shown in FIG. 1 and the depressed flashing area 56 above withdrawal means 34.

The process of the present invention has been defined with respect to a spout container having an integral lift tab compression molded simultaneously with registration of the mold sections. It should be pointed out that while only two mold sections are utilized for illustrative purposes, depending upon the particular item being molded, a plurality of mold sections in excess of two could likewise be employed. Moreover, obviously it is necessary in the proper techniques of molding that the various compression or blow mold cavities as the case may be, should need to be produced to afford proper registration and proper draft for the item being produced therein. The Figures provided in conjunction with the present invention are for schematic, illustrative purposes only and certainly these molds could be modified according to conventional molding techniques to achieve a particular end result.

Once the mold sections have been brought into proper registry and entrapped the parison at the proper peripheral portions of the blow mold cavities, the lift tab will have been compression molded. Thereafter, the conduit for the expanding fluid is provided in communication with the interior of the parison within the blow mold cavities and the expanding fluid forced therein to expand the parison into proper conformity with the blow mold cavities. Thereafter, the mold sections re-open, move out of registry, exposing the molded product, which is then ejected from the mold, trimmed, if necessary to remove any flashing therefrom, and transported to any further processing that may be desired. Such additional processing could involve the nesting of the spout within the container, printing, or the like. Thereafter, the container may be filled on conventional fill equipment and capped with an appropriate lid.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. An improved process for blow molding a container comprising the steps of:
   (a) providing a pliant plastic parison between mold sections, said mold sections having blow mold cavities defined therein;
   (b) bringing said mold sections into registry and entrapping said plastic parison therebetween, a portion of said parison being held within said cavities in said mold sections that define an article to be produced therein;
   (c) simultaneously engaging another portion of said parison outside said mold cavities adjacent an end thereof with matching compression mold die portions of said mold sections which are angularly offset from a center line through said blow mold cavities, and forcing said another portion of said parison into said angularly offset die portions and entrapping same therebetween, thereby compression molding an appendage to said end of said container with a central opening defined therein, said appendage being positioned at an angle with respect to a plane tangent to an upper portion of said ends of said container; and (d) thereafter injecting a blow fluid internally of said plastic parison portion whereby said plastic parison portion is forced outwardly into conformity with said blow mold cavities to produce the container therein.

2. The process as defined in claim 1 wherein said compression molding takes place in appropriate mold cavities therefor.

3. The process as defined in claim 1 wherein the blow mold cavities in said mold sections define a container body, a container top integral with said body, a pouring spout integral with said top and having means to permit eversion of said spout to a nesting position within said container body, said spout having a top integral therewith, and wherein said compression molded appendage is a spout withdrawal means that is integral with said spout top.

4. The process as defined in claim 3 wherein said container is produced from polyethylene.

5. The process as defined in claim 1 wherein the withdrawal means is compression molded with a finger opening therethrough.

6. An improved process for molding a container comprising the steps of:

(a) providing a plurality of mating mold sections, said mold sections having blow mold cavities therein defining a container body, a container top integral with said body, a pouring spout integral with said top, said spout being defined to permit eversion of same to nest within said container body, and a spout top integral with said spout, and having matching compression mold dies defining a spout withdrawal means integral with said spout top located adjacent said blow mold cavities for said spout top, said compression mold dies being angularly disposed with respect to a line tangent to the upper portion of said top and angularly offset from a center line through said blow mold cavities;

(b) positioning a plastic parison between said mold sections;

(c) bringing said mold sections into registry and entrapping a portion of said parison within said blow mold cavities and simultaneously forcing another portion of said parison outside said blow mold cavities into said angularly offset matching compression mold dies and entrapping said another portion of said parison therebetween, thereby compression molding said withdrawal means in said angular relationship with a central opening defined therein;

(d) injecting a blow fluid internally of said portion of said parison held within said blow mold cavities and expanding said portion into conformity with said blow mold cavities;

(e) separating said mold sections; and (f) ejecting said container from said mold sections.

7. The process as defined in claim 6 wherein said parison is polyethylene.

8. The process as defined in claim 6 wherein the compression mold dies define a withdrawal means having a ring defining a finger receiving opening therethrough.

9. The process as defined in claim 6 wherein the compression mold dies in each mold section have both male and female sections therein.

* * * * *